United States Patent
Kimura et al.

[11] Patent Number: 5,818,974
[45] Date of Patent: Oct. 6, 1998

[54] IMAGE CODING APPARATUS

[75] Inventors: Shunichi Kimura; Yutaka Koshi; Koh Kamizawa, all of Ebina, Japan

[73] Assignee: Fuji Xerox Co., Ltd., Tokyo, Japan

[21] Appl. No.: 968,909

[22] Filed: Nov. 6, 1997

Related U.S. Application Data

[63] Continuation of Ser. No. 693,012, Aug. 6, 1996, abandoned, which is a continuation of Ser. No. 305,875, Sep. 15, 1994, abandoned.

[30] Foreign Application Priority Data

Sep. 17, 1993 [JP] Japan ................................. 5-232070

[51] Int. Cl.⁶ .............................. G06K 9/38; G06K 9/36; H04N 1/417; H04N 1/415
[52] U.S. Cl. .................. 382/270; 382/232; 382/239; 382/251; 358/430; 358/433
[58] Field of Search .................................. 382/239, 270, 382/251, 232; 358/430, 433

[56] References Cited

U.S. PATENT DOCUMENTS

| | | | |
|---|---|---|---|
| 4,802,232 | 1/1989 | Altes | 382/239 |
| 4,920,426 | 4/1990 | Hatori et al. | 358/430 |
| 5,086,488 | 2/1992 | Kato et al. | 382/239 |
| 5,301,242 | 4/1994 | Gonzales et al. | 382/239 |
| 5,307,177 | 4/1994 | Shibata et al. | 358/430 |
| 5,392,362 | 2/1995 | Kimura et al. | 382/239 |
| 5,394,473 | 2/1995 | Davidson | 381/36 |
| 5,414,527 | 5/1995 | Koshi et al. | 358/433 |
| 5,442,399 | 8/1995 | Asamura et al. | 348/394 |
| 5,444,800 | 8/1995 | Kim | 382/239 |

OTHER PUBLICATIONS

"Sub–Band Coding of Images", John W. Woods et al., IEEE Transactions on Acoustics, Speech, and Signal Processing, 34(5):1278–1288 (1986).

*Primary Examiner*—Andrew W. Johns
*Assistant Examiner*—Monica S. Davis
*Attorney, Agent, or Firm*—Finnegan, Henderson, Farabow, Garrett & Dunner, L.L.P.

[57] ABSTRACT

An image coding apparatus wherein an image signal including a locally high signal can be coded efficiently with minimized distortion by adaptively performing quantization for each subblock. An input image signal is divided into a plurality of subband signals by a subband division section. The subband signals from the subband division section are each divided into a plurality of subblocks by a subblock division section. In a classification section, a subband signal is classified, for each of the subblocks from the subblock division section, in terms of a feature parameter of an image, for example, a dynamic range, and a class index is outputted. In a quantization section, a quantizer is changed over for each subblock in response to the class index from the classification section. Each subblock is coded with a necessary minimum number of bits. The bit number is multiplexed with a code. Accordingly, the code can be decoded by referring to the bit number.

2 Claims, 5 Drawing Sheets

TWO-DIMENSIONAL FREQUENCY
AREA OF INPUT IMAGE ns between adjacent steps.
IMAGE CODING APPARATUS This application is a continuation of application Ser. No. 08/693,012, filed Aug. 6, 1996, which application is a continuation of application Ser. No. 08/305,875 filed Sep. 15, 1994, all now abandoned.

BACKGROUND OF THE INVENTION

1. Field of the Invention

This invention relates to an image coding apparatus for coding an input image signal, and more particularly to an image coding apparatus which makes use of subband division.

2. Description of the Related Art

Various image coding apparatus for coding an input image which employ various methods are known, and one of such image coding apparatus is an image coding apparatus which makes use of subband division.

In an image coding apparatus which makes use of subband division, an input image signal is divided into a plurality of subband signals having different frequency bands from each other, and a suitable bit is distributed to each of the subbands and each of the subband signals is represented with a number of bits smaller than the number of bits of the original signal to obtain a high coding efficiency.

FIG. 4 shows the construction for performing subband division. In subband division, an input image signal S0 is divided into a plurality of signals of different frequency bands, that is, subband signals S1 and S2, by a pair of digital filters F1 and F2, respectively. Such subband division is performed for signals in a vertical direction and a horizontal direction or is performed at a plurality of stages to divide an input signal into different bands of two-dimensional frequency bands shown in FIG. 5B. In particular, frequencies of an image can be represented on a two-dimensional area as seen in FIG. 5A. The two-dimensional area is divided into a plurality of frequency areas as seen, for example, in FIG. 5B. Signals of each of the divisional frequency areas make subband signals.

In the subband division system, an input image signal is divided, as seen in FIG. 6, by subband division by a subband division section 1 to obtain a plurality of subband signals X, and a probability density function of the signal distribution of each of the subbands is assumed and optimum quantization is performed for the probability density function by a nonlinear quantization section 6. For example, non-linear quantization of such a characteristic as seen in FIG. 7 is performed to compress the original signal.

With the conventional system shown in FIG. 6, however, since non-linear quantization of the same characteristic is performed for an entire image, the system cannot cope with a local variation of the image. Consequently, gradient overload noise or granular noise is generated. It is to be noted that gradient overload noise is noise generated when a signal exceeds a maximum value in quantization, and granular noise is noise generated when the quantization minimum step is excessively great.

For example, in the example of FIG. 7, since no corresponding quantization index is provided where the value of the input signal is higher than $X_{max}$ or lower than $-X_{max}$, gradient overload noise is generated. In order to avoid gradient overload noise with a same bit distribution, the step widths should be increased to increase $X_{max}$. This, however, increases the step distance for quantization, resulting in loss of information of the input signal between adjacent steps. Consequently, granular noise is generated.

In order to eliminate the problems described above, another system has been proposed wherein each subband is divided into spatial subblocks as seen in FIG. 2 and classified and then optimum bit distribution is performed for each of the classes (refer to J. W. Woods and S. D. O'Neil, "Subband Coding of Images", IEEE Trans., Acoust., Speech & Signal Process., ASSP-34, No. 5, October 1986, pp.1, 278–1,288).

In particular, referring to FIG. 8, the system proposed includes a subblock division section 2 connected to a subband division section 1 for dividing subband signals into subblocks, a classification section 4 for classifying, for each subblock, subband signals to obtain a class index representative of a class, and a non-linear quantization section 6 including a plurality of quantizers having different characteristics. In the non-linear quantization section 6, a quantizer to be used for each subblock is changed over in accordance with the class.

Also with the conventional system shown in FIG. 8, however, since bit distribution is performed in view. of an average of an entire class, there is a drawback in that the conventional system cannot cope with a locally high signal and consequently gradient overload noise is generated. Further, in order to prevent generation of gradient overload noise, the step width for quantization should be decreased. In this instance, however, another drawback that the distribution bit number is increased and the coding efficiency is deteriorated arises.

SUMMARY OF THE INVENTION

It is an object of the present invention to provide an image coding apparatus wherein an image signal including a locally high signal can be coded efficiently with minimized distortion by adaptively performing quantization for each subblock.

In order to attain the object described above, according to the present invention, there is provided an image coding apparatus, which comprises a subband division section for dividing an input image signal into a plurality of subband signals having frequency bands different from each other, a subblock division section for dividing each of the subband signals obtained from the subband division section into a plurality of subblocks each having a spatial spread, a quantization section for quantizing each of the subband signals to obtain a quantization index and outputting the quantization index, and a bit distribution section for detecting dynamic range of the subband signals of each of the subblocks from the subblock division section and determining a quantization bit number to be used by the quantization section in accordance with the dynamic range, wherein a code structure for each subblock is formed, including a code length information section for storing the quantization bit number determined by said bit distribution LAW OFFICES section, and a code information section containing the quantization index of each said subband of each said subblock.

The bit distribution section may be a classification section which classifies the feature parameter of the subband signals of each of the subblocks from the subblock division section and outputs a corresponding class index, and the quantization section may include a plurality of quantizers and determine one of the quantizers to be used for each subblock in response to the class index from the classification section.

In the image coding apparatus, when quantization is to be performed for each of spatial subblocks into which each of subbands is divided, in order to eliminate otherwise possible gradient overload noise, the maximum value for quantization is set to a sufficiently high value, but in order to eliminate otherwise possible granular noise, each step width is set to a low value.

In this instance, if the bit number is distributed so that a sufficient number of quantization levels is assured for a signal of a high level, then a surplus or useless number of bits are distributed to a signal of a low level.

Therefore, in the present invention, quantization is performed, for each subblock, with a number of bits conforming to the magnitude of a dynamic range, and information of with what number of bits quantization for the subblock has been performed is added to code information. This eliminates use of a useless number of bits. In other words, each subblock can be quantized only with an effective number of bits. Accordingly, generation of gradient overload noise can be prevented without increasing the distributed bit number.

In the quantization section, each subband signal is quantized, for example, by linear quantization. For the step width of such linear quantization, a step width determined for each subband can be used.

Or else, in the quantization section, non-linear quantization with a sufficiently high maximum value for quantization is performed for each subband. In this instance, the quantization method for the non-linear quantization is determined for each subband.

Further, each subband may be classified so that the step width of a quantizer or for linear quantization may be varied for each class.

With the image coding apparatus, since each subband is divided into spatial subblocks and is coded with a number of quantization bits which is different in accordance with a feature parameter such as a dynamic range of each subblock, even where the nature of an image exhibits a local variation, coding can be performed efficiently with minimized distortion.

Further, since classification allows collection of subblocks of similar natures and quantization of signals in such subblocks with a suitable step width, there is an advantage in that, comparing with an alternative case wherein no such classification is performed, finer quantization can be performed in a complicated area of an image whereas rough quantization can be performed in another simple area of the image.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Figure 1:
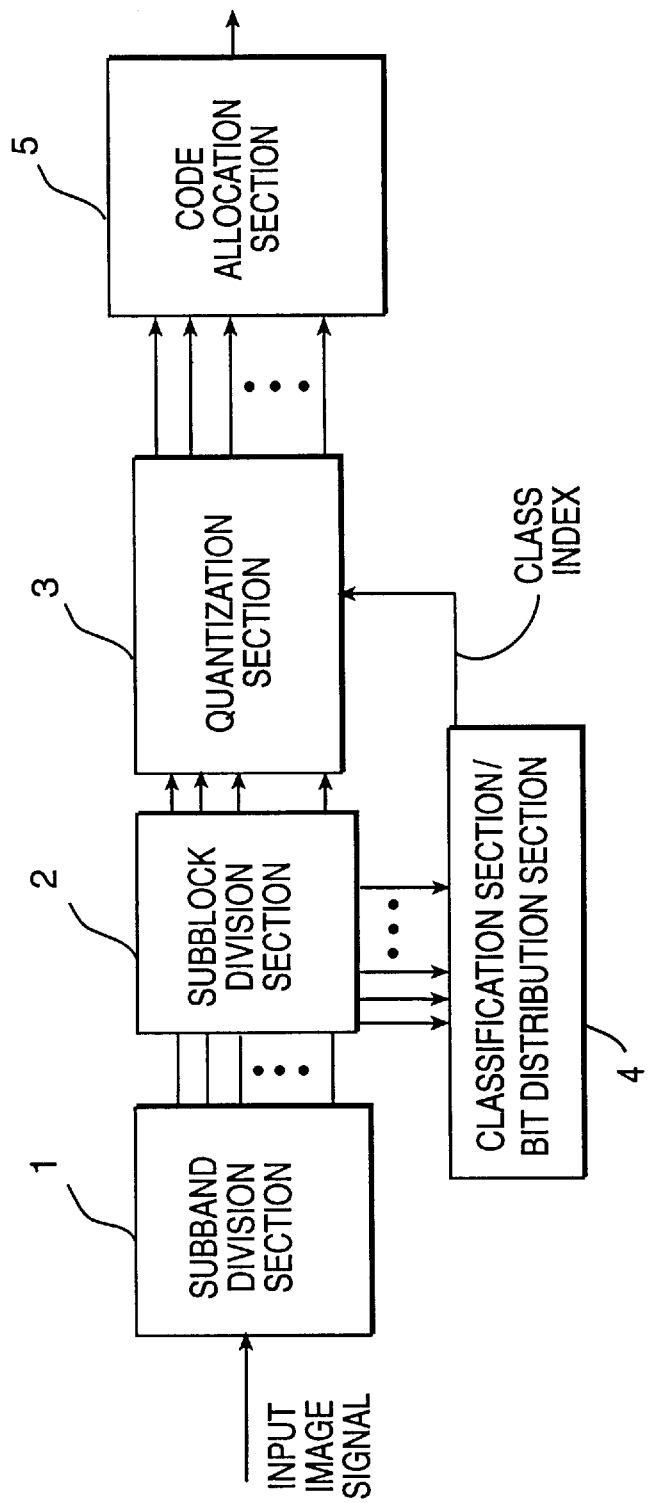
FIG. 1 is a block diagram illustrating the construction in principle of an image coding apparatus according to the present invention.

Referring first to FIG. 1, there is shown an image coding apparatus to which the present invention is applied. The image coding apparatus shown includes a subband division section 1 for dividing an input image signal into a plurality of subband signals having different frequency bands from each other, a subblock division section 2 for dividing a plurality of subband signals obtained from the subband division section 1 into a plurality of subblocks each having a spatial spread, a quantization section 3 for quantizing subband signals for each subblock obtained by division by the subblock division section 2 and outputting a quantization index, a classification section 4 for detecting a certain feature parameter (activity), for example, a dynamic range, of subband signals for each subblock obtained by division by the subblock division section 2 to classify the subband signals, and a code allocation section 5 for allocating a code to a quantization index from the quantization section 3. The quantization section 3 includes a plurality of quantizers having different quantization step widths, and a quantizer to be used is changed over for each subblock in response to a class index from the classification section 4.

Operation of the image coding apparatus described hereinabove with reference to FIG. 1 will be described subsequently.

Figure 2:
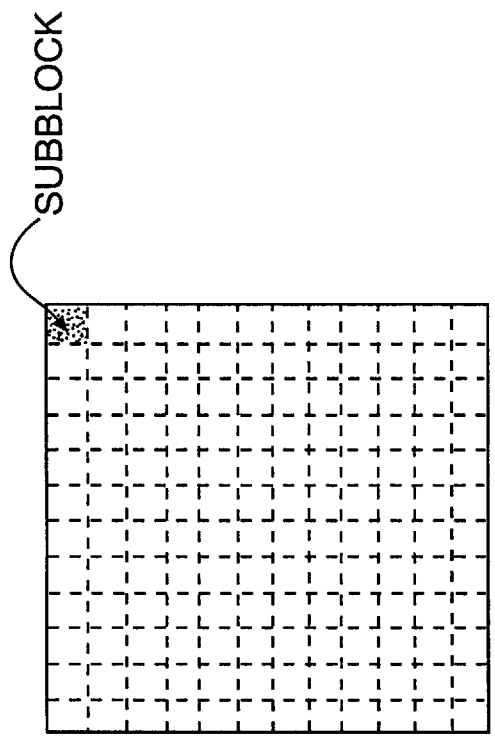
FIG. 2 is a diagrammatic view illustrating the subblock code structure.

An input image signal is divided into a plurality of subband signals by the subband division section 1. Here, the input image signal supplied to the subband division section 1 is a digital signal of the image intensity, and the subband signals are digital signals of the image intensity having different frequency bands. The subband signals from the subband division section 1 are divided into a plurality of subblocks each having a spatial spread as seen in FIG. 2. Here, the input image signal has an image area, the subband signals have and all of the subblocks have image areas, and these image areas correspond to one another in terms of the position. In the example of FIG. 2, the input image is divided into 144 (=12×12) subblocks, and a portion provided with slanting lines in FIG. 2 corresponds to one subblock.

In the classification section 4, each subband signal is classified in terms of a feature parameter, for example, a dynamic range, for each of the subblocks divided by the subblock division section 2, and a class index is outputted. In the quantization section 3, a quantizer to be used is changed over for each subblock in response to the class index from the classification section 4. In particular, a quantizer having a smaller step width is used for subband signals of a class having a great dynamic range, but another quantizer having a greater step width is used for subband signals of another class having a small dynamic range.

The reason why a quantizer to be used is changed over in response to a dynamic range will be described below. Since an area having a great dynamic range is a range having a high feature parameter (activity), it is an important area. Therefore, for the class having a great dynamic range, a small step size is used. On the contrary for the class having a small dynamic range, a large size is used.

Further, since the coding bit number is adapted in response to the magnitude of a dynamic range for each subblock, even if the nature of the image varies locally, signals of each subblock are coded with a minimum necessary number of bits, and consequently, the coding efficiency can be enhanced without deterioration of the picture quality. It is to be noted that the minimum necessary number of bits here denotes code length information described below.

Figure 3:
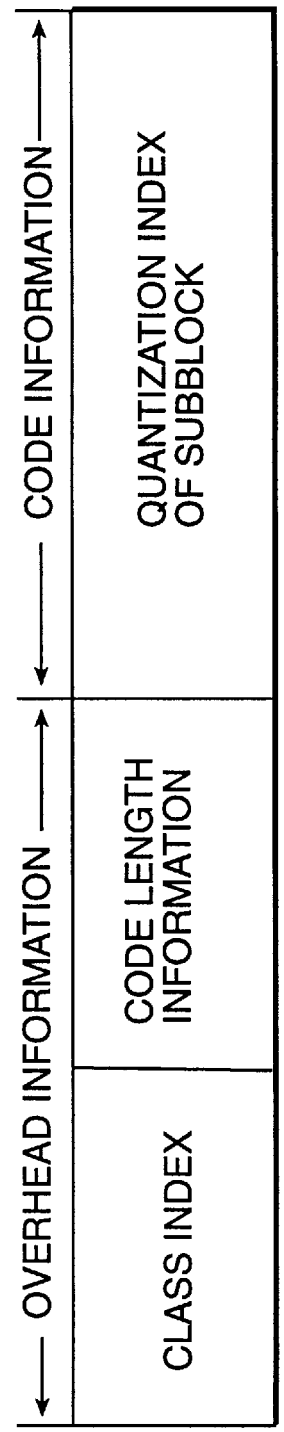
FIG. 3 is a diagrammatic view illustrating the code structure of a subblock.
Figure 4:
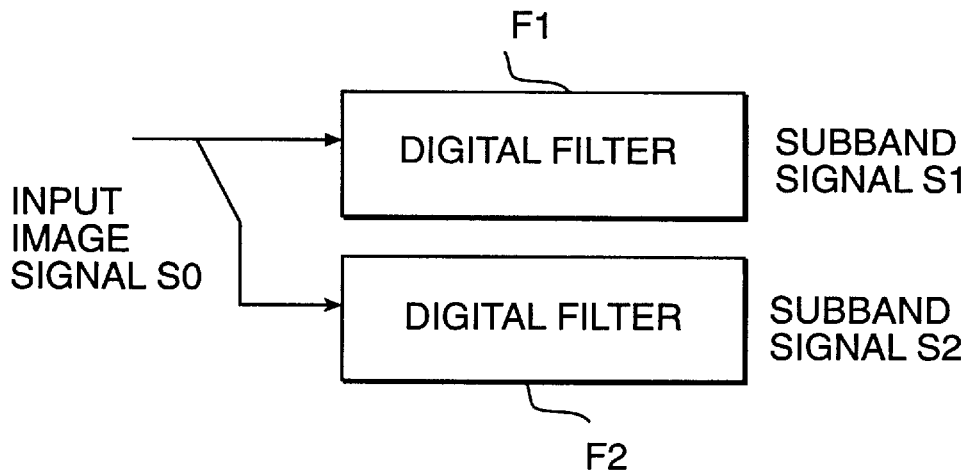
FIG. 4 is a block diagram showing the construction for performing subband division.
Figure 5A:
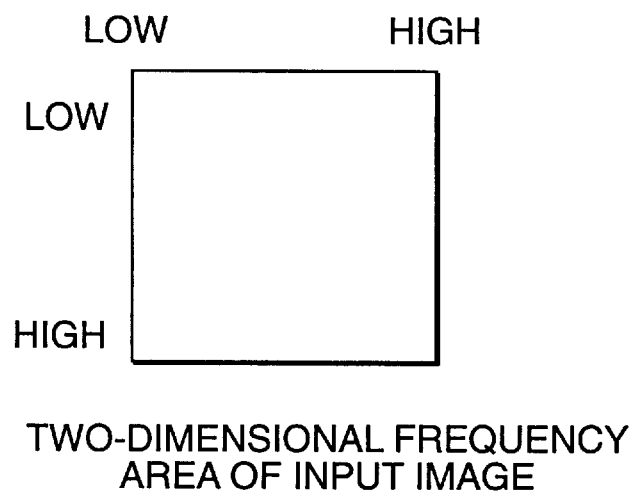
FIGS. 5A and 5B are diagrammatic views illustrating subband division.
Figure 5B:
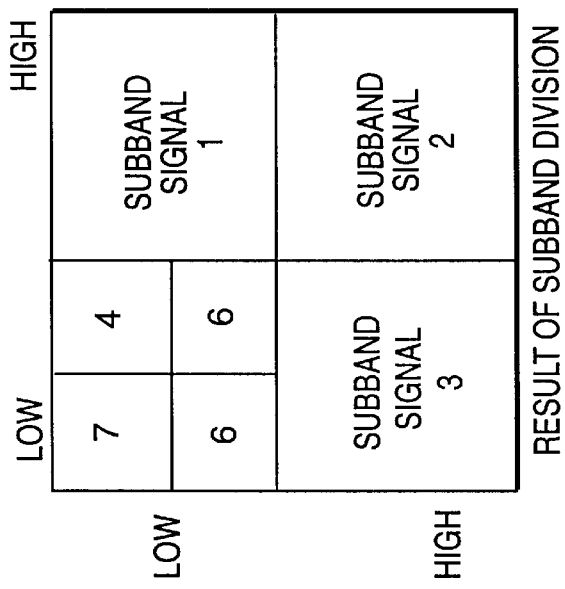
Figure 6:
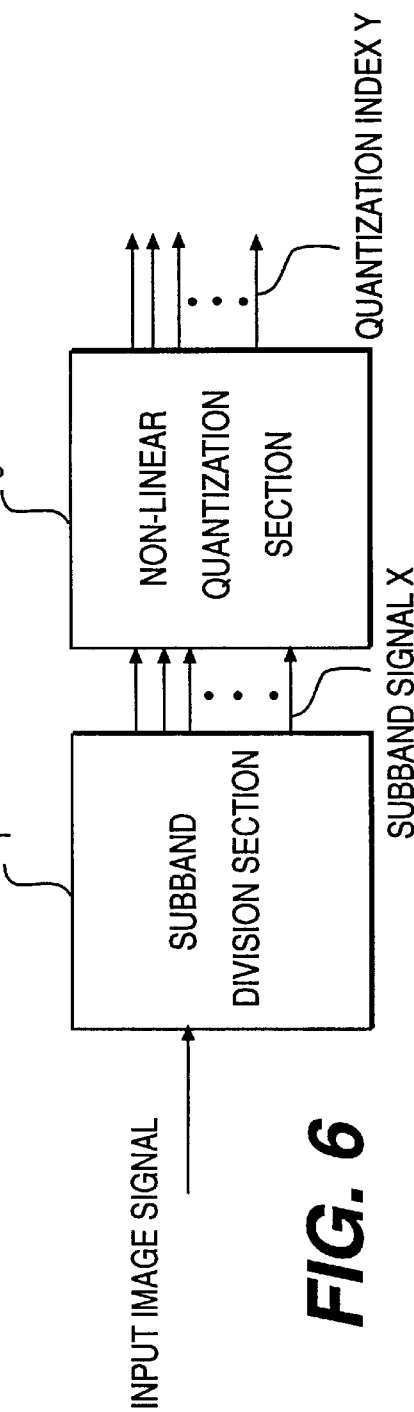
FIG. 6 is a block diagram showing a conventional image coding apparatus which makes use of subblock division.
Figure 7:
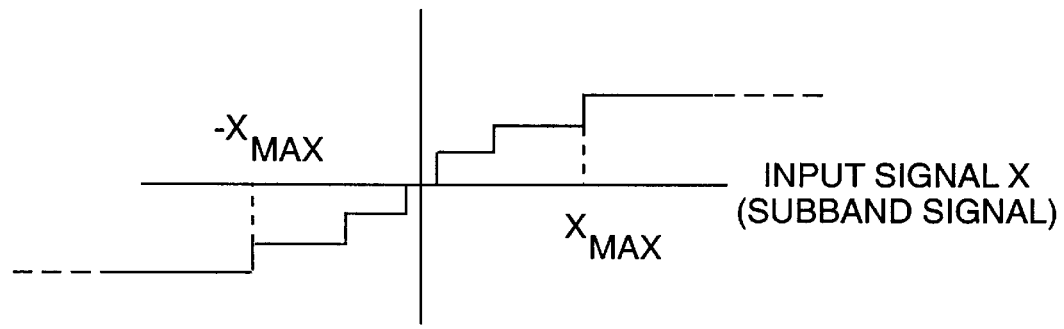
FIG. 7 is a diagram illustrating non-linear quantization.
Figure 8:
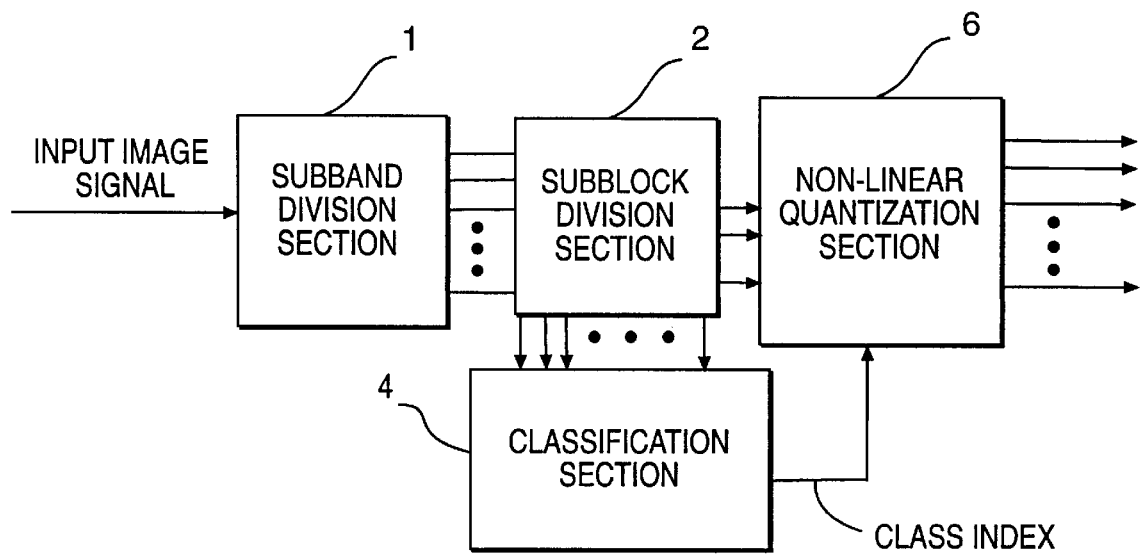
FIG. 8 is a block diagram showing another conventional image coding apparatus which makes use of subblock division.

Upon quantization, a class index of a subblock which is an object for quantization and information (code length information) representing with what number of bit signals of the subblock are coded per one signal are added as overhead information of the subblock to code information representative of a quantization index of the subblock as seen in FIG. 3.

Accordingly, upon decoding, the class index and the code length information are referred to regenerate subband signals from the quantization index, and the original image signal can be regenerated from such subband signals.

An example of the procedure of coding described above will be described below.

First, a step width s to be used to quantize subblocks belonging to each classes is determined.

It is to be noted that, here, where the signal is X and the step width is s, quantization for the quantization q is performed as given by when $X \geq 0, q = Q((X+s/2)/s)$, but when $X < 0, q = Q((X-s/2)/s)$ where $Q(x)$ is a function to omit a fraction of x.

For example, when the step width s is 2, the dynamic range of each subblock and the code length information have the following relationship.

When the dynamic range of a subblock is 6, the number of available levels is 3. Consequently, the quantization index varies among −1, 0 and 1. Therefore, coding can be performed with 2 bits (4 levels). Accordingly, the code length information is 2. Thus, in the subblock, coding is performed with 2 bits per one signal.

When the dynamic range of a subblock is 10, the number of available levels is 5. Consequently, the quantization index varies among −1, −2, 0, 1 and 2. Therefore, coding can be performed with 3 bits (8 levels). Accordingly, the code length information is 3. Thus, in the subblock, coding is performed with 3 bits per one signal.

A quantization index is quantized with a number of bits indicated by code length information in this manner. Then, the code length information is multiplexed with a code as seen in FIG. 3.

It is to be noted that classification may not be performed in terms of the dynamic range but in terms of the dispersion or the average of absolute values. Further, classification need not necessarily be performed.

Having now fully described the invention, it will be apparent to one of ordinary skill in the art that many changes and modifications can be made thereto without departing from the spirit and scope of the invention as set forth herein.

What is claimed is:

1. An image coding apparatus, comprising:
   a subband division section for dividing an input image signal into a plurality of subband signals having frequency bands different from each other;
   a subblock division section for dividing each of the subband signals obtained from said subband division section into a plurality of subblocks each having a spatial spread;
   a quantization section for inputting subband signals of each of the plurality of subblocks directly from said subblock division section quantizing the input subband signals to obtain a quantization index and outputting the quantization index;
   a bit distribution section for detecting a dynamic range of the subband signals of each of the plurality of subblocks obtained from said subblock division section, the subband signals being the same as the subband signals input to the quantization section; and
   a code allocation section for allocating a code for each subblock, wherein the structure of the code includes a single code length information section for storing a code length and a code information section containing the quantization index output by said quantization section, the code length being determined in accordance with the dynamic range of the subband signals of each of the plurality of subblocks detected by the bit distribution section and representing the number of bits with which each of the subband signals of each subblock is coded.

2. An image coding apparatus comprising:
   a subband division section for dividing an input image signal into a plurality of subband signals having frequency bands different from each other;
   a subblock division section for dividing each of the subband signals obtained from said subband division section into a plurality of subblocks each having a spatial spread;
   a quantization section including a plurality of quantizers having different quantization step widths, for inputting subband signals of each of the plurality of subblocks directly from said subblock division section, quantizing the input subband signals to obtain a quantization index, and outputting the quantization index;
   a bit distribution section for detecting a dynamic range of the subband signals of each of the plurality of subblocks obtained from said subblock division section, wherein the subband signals are the same as the subband signals input to the quantization section, for classifying the magnitude of the dynamic range of the subband signals of each of the subblocks from said subblock division section into at least two levels to determine a class index corresponding to one of the levels in order to select one of the quantizers included in said quantization section so that the quantizer having a smaller step width is selected for subband signals of the class index corresponding to a greater dynamic range, and for determining a quantization bit number in accordance with the magnitude of the dynamic range and the selected quantizer and
   a code allocation section for allocating a code for each subblock, wherein the structure of the code includes a single code length information section for storing a code length and a code information section containing the quantization index output by said quantization section, the code length being determined in accordance with the dynamic range of the subband signals of each of the plurality of subblocks detected by the bit distribution section and representing the number of bits with which each of the subband signals of each subblock is coded.

* * * * *

UNITED STATES PATENT AND TRADEMARK OFFICE
CERTIFICATE OF CORRECTION

PATENT NO. : 5,818,974
DATED : October 6, 1998
INVENTOR(S) : Kimura et al.

It is certified that error appears in the above-indentified patent and that said Letters Patent is hereby corrected as shown below:

In Claim 1, col. 6, line 3, after "section", insert --,--.

In Claim 2, col. 6, line 54, after "quantizer", insert --;--.

Signed and Sealed this

Twenty-first Day of September, 1999

Attest:

Q. TODD DICKINSON

*Attesting Officer*     *Acting Commissioner of Patents and Trademarks*